United States Patent
Ohtsuka

(10) Patent No.: US 10,880,479 B2
(45) Date of Patent: Dec. 29, 2020

(54) IMAGING DEVICE INCLUDING MECHANICAL FIXING MECHANISM RESPONSIVE TO LARGE EXTERNAL FORCE

(71) Applicant: Panasonic Intellectual Property Management Co., Ltd., Osaka (JP)

(72) Inventor: Yoshio Ohtsuka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/446,709

(22) Filed: Jun. 20, 2019

(65) Prior Publication Data

US 2020/0007768 A1 Jan. 2, 2020

(30) Foreign Application Priority Data

Jun. 28, 2018 (JP) ................. 2018-123507

(51) Int. Cl.
*H04N 5/232* (2006.01)
*H04N 5/225* (2006.01)
*H04R 1/04* (2006.01)
*G03B 17/14* (2006.01)
*G03B 5/02* (2006.01)
(Continued)

(52) U.S. Cl.
CPC ....... *H04N 5/23258* (2013.01); *G02B 27/646* (2013.01); *G03B 5/02* (2013.01); *G03B 17/14* (2013.01); *H04N 5/2253* (2013.01); *H04N 5/2254* (2013.01); *H04R 1/028* (2013.01); *H04R 1/04* (2013.01); *G03B 2205/0015* (2013.01); *H04R 2499/11* (2013.01)

(58) Field of Classification Search
CPC .... G02B 27/64; G02B 27/644; G02B 27/646; G03B 2205/0007; G03B 2205/0023; G03B 2205/0038; G03B 5/02; G03B 17/14; G03B 2205/0015; H04N 5/2253; H04N 5/2254; H04N 5/23258; H04N 5/23209; H04N 5/23287; H04R 1/028; H04R 1/04; H04R 2499/11
See application file for complete search history.

(56) References Cited

U.S. PATENT DOCUMENTS 7,554,075 B2 * 6/2009 Tanaka ................. G02B 27/646
250/216
7,680,403 B2 * 3/2010 Okumura ........... H04N 5/23248
396/55
(Continued)

FOREIGN PATENT DOCUMENTS

| JP | 2008-244534 A | 10/2008 |
|---|---|---|
| JP | 2009-244489 A | 10/2009 |

(Continued)

*Primary Examiner* — Nicholas G Giles
(74) *Attorney, Agent, or Firm* — Renner, Otto, Boisselle & Sklar, LLP

(57) ABSTRACT

An imaging device includes an image pickup element that captures an object image to generate image data, a sensor holder that holds the image pickup element, a sensor driver that moves the sensor holder in a plane orthogonal to an optical axis, a fixing mechanism that mechanically fixes the sensor holder at a predetermined position, and a controller that controls the fixing mechanism based on a signal indicating a degree of displacement of the image pickup element due to an external force.

9 Claims, 10 Drawing Sheets

(51) Int. Cl.
*G02B 27/64* (2006.01)
*H04R 1/02* (2006.01)

(56) References Cited

U.S. PATENT DOCUMENTS

| | | | | |
|---|---|---|---|---|
| 8,090,249 | B2* | 1/2012 | Suzuka | G02B 27/646 |
| | | | | 396/55 |
| 8,396,357 | B2* | 3/2013 | Yanagisawa | H04N 5/2254 |
| | | | | 396/55 |
| 8,416,340 | B2* | 4/2013 | Shintani | H04N 5/2258 |
| | | | | 348/360 |
| 9,398,220 | B2* | 7/2016 | Noguchi | H04N 5/23287 |
| 2009/0245774 | A1 | 10/2009 | Uenaka | |
| 2011/0129206 | A1 | 6/2011 | Muramatsu | |

FOREIGN PATENT DOCUMENTS

| | | |
|---|---|---|
| JP | 2011-112948 A | 6/2011 |
| JP | 2016-126164 A | 7/2016 |

\* cited by examiner

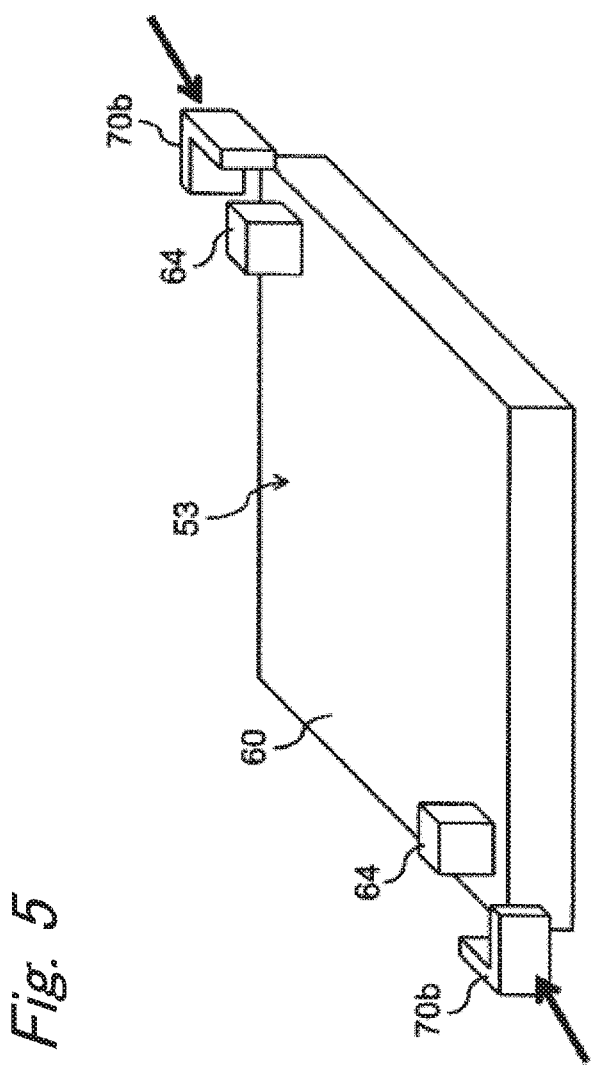

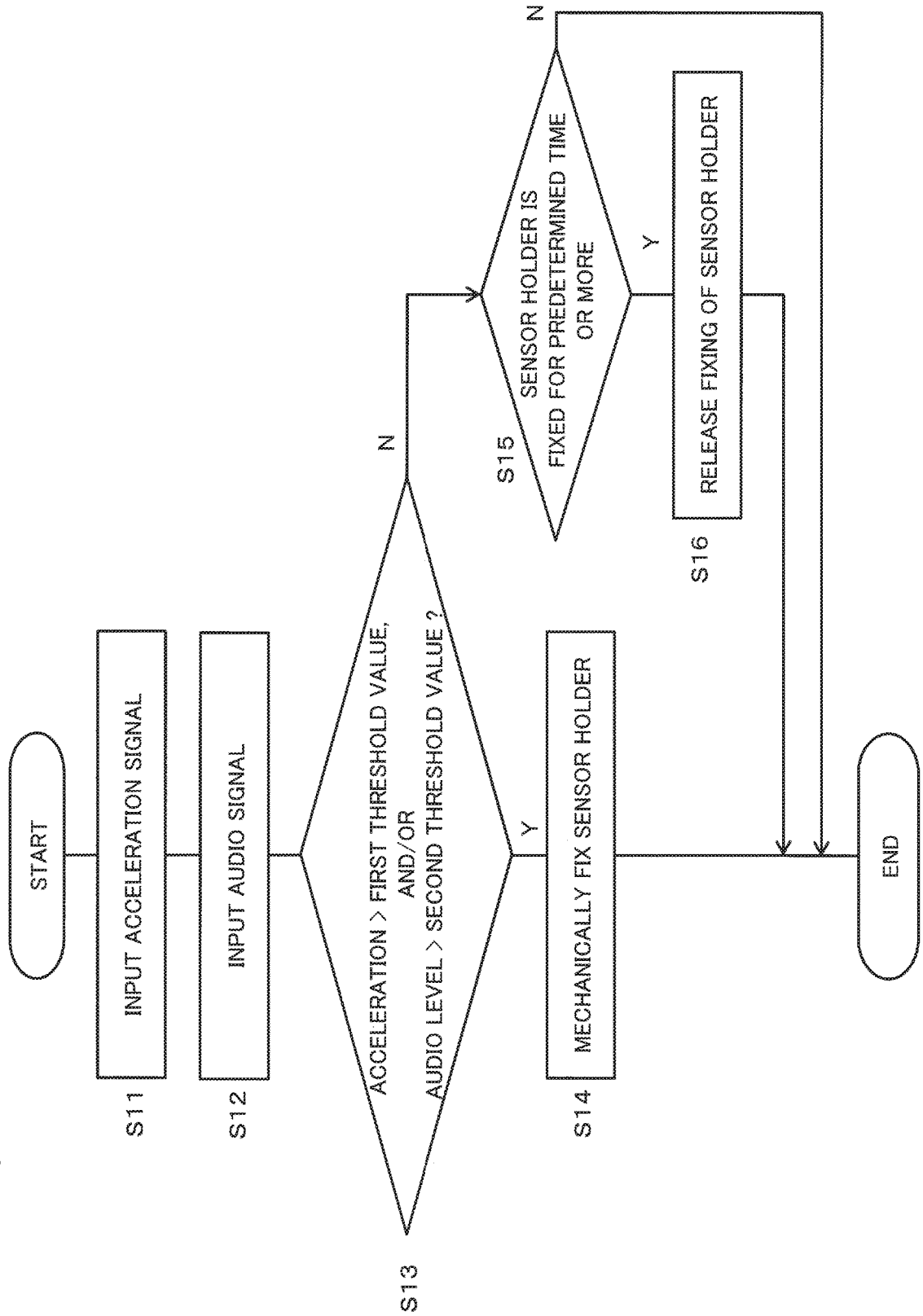

IMAGING DEVICE INCLUDING MECHANICAL FIXING MECHANISM RESPONSIVE TO LARGE EXTERNAL FORCE

BACKGROUND

1. Technical Field

The present disclosure relates to an imaging device including a shake correction function with an image sensor moved.

2. Related Art

JP 2011-112948 A discloses an imaging device which has a shake correction function for correcting a shake by moving an image pickup element in a plane perpendicular to an optical axis direction. This imaging device includes a shake correction mechanism for correcting a shake with electrically holding the image pickup element at an optional position in a plane orthogonal to the optical axis direction of an imaging optical system under the control of an applied current, and a holding mechanism for mechanically regulating the movement of the image pickup element. The holding mechanism is configured to be switchable between a holding state in which the image pickup element is held by mechanical holding in which the holding member is engaged with the shake correction mechanism to mechanically regulate the movement of the image pickup element and a released state in which the engagement of the holding member is released. The holding mechanism is brought into the holding state when the shake correction mechanism is not operated. The holding mechanism includes a positioning mechanism for biasing the holding member with an elastic member so that the holding position of the image pickup element in the holding state is positioned to the origin position by the electric holding in the released state. When the imaging device is activated, the imaging device executes a deviation cancellation operation. In the deviation cancellation operation, first, the holding mechanism is brought into the released state and then into the holding state. With this configuration, in transition from the mechanical holding state to the electrical holding state, it is possible to reduce the occurrence of blurring in the image due to the deviation from the origin position of the image pickup element, and the user is surely prevented from feeling discomfort.

SUMMARY

In an imaging device for holding an image pickup element or the like in a floating state for shake correction as in JP 2011-112948 A, image quality deterioration may occur during execution of the shake correction function due to the structure thereof.

The present disclosure provides an imaging device that performs shake correction by moving an image pickup element or the like, the imaging device reducing image quality deterioration that may occur during execution of a shake correction function.

A first aspect of the present disclosure provides an imaging device. The imaging device includes: an image pickup element that captures a subject image to generate image data; a sensor holder that holds the image pickup element; a sensor driver that moves the sensor holder in a plane orthogonal to an optical axis; a fixing mechanism that mechanically fixes the sensor holder at a predetermined position; and a controller that controls the fixing mechanism based on a signal indicating a degree of displacement of the image pickup element due to an external force.

A second aspect of the present disclosure provides an imaging device including an interchangeable lens, and a camera body on which the interchangeable lens is mounted. The imaging device includes: an optical system including a correction lens; an image pickup element that captures an object image obtained through the optical system, to generate image data; a lens holder that holds the correction lens; a lens driver that moves the lens holder in a plane orthogonal to an optical axis to perform shake correction; a fixing mechanism that mechanically fixes the lens holder at a predetermined position; and a controller that controls the fixing mechanism based on a signal indicating a degree of displacement of the image pickup element due to an external force.

A third aspect of the present disclosure provides an interchangeable lens having a shake correction function, the interchangeable lens that can be mounted on a camera body. The interchangeable lens includes: an optical system including a shake correction lens; a lens holder that holds the shake correction lens; a lens driver that moves the lens holder in a plane orthogonal to an optical axis to perform shake correction; a fixing mechanism that mechanically fixes the lens holder at a predetermined position; and a controller that controls the fixing mechanism, wherein the controller controls the fixing mechanism to mechanically fix the lens holder at a predetermined position based on a signal indicating a degree of displacement of the lens holder due to an external force.

According to the present disclosure, in an imaging device that moves an image pickup element or the like to perform shake correction, the image pickup element or the like is mechanically fixed, and it is thus possible to reduce the image quality deterioration that occurs during execution of the shake correction function.

BRIEF DESCRIPTION OF DRAWINGS

FIG. 5 is a diagram illustrating a second configuration example of a mechanism for fixing the image sensor.

FIG. 8 is a flowchart illustrating fixing processing of the image sensor based on acceleration and sound level in the first embodiment of the present disclosure.

DETAILED DESCRIPTION

Figure 1:
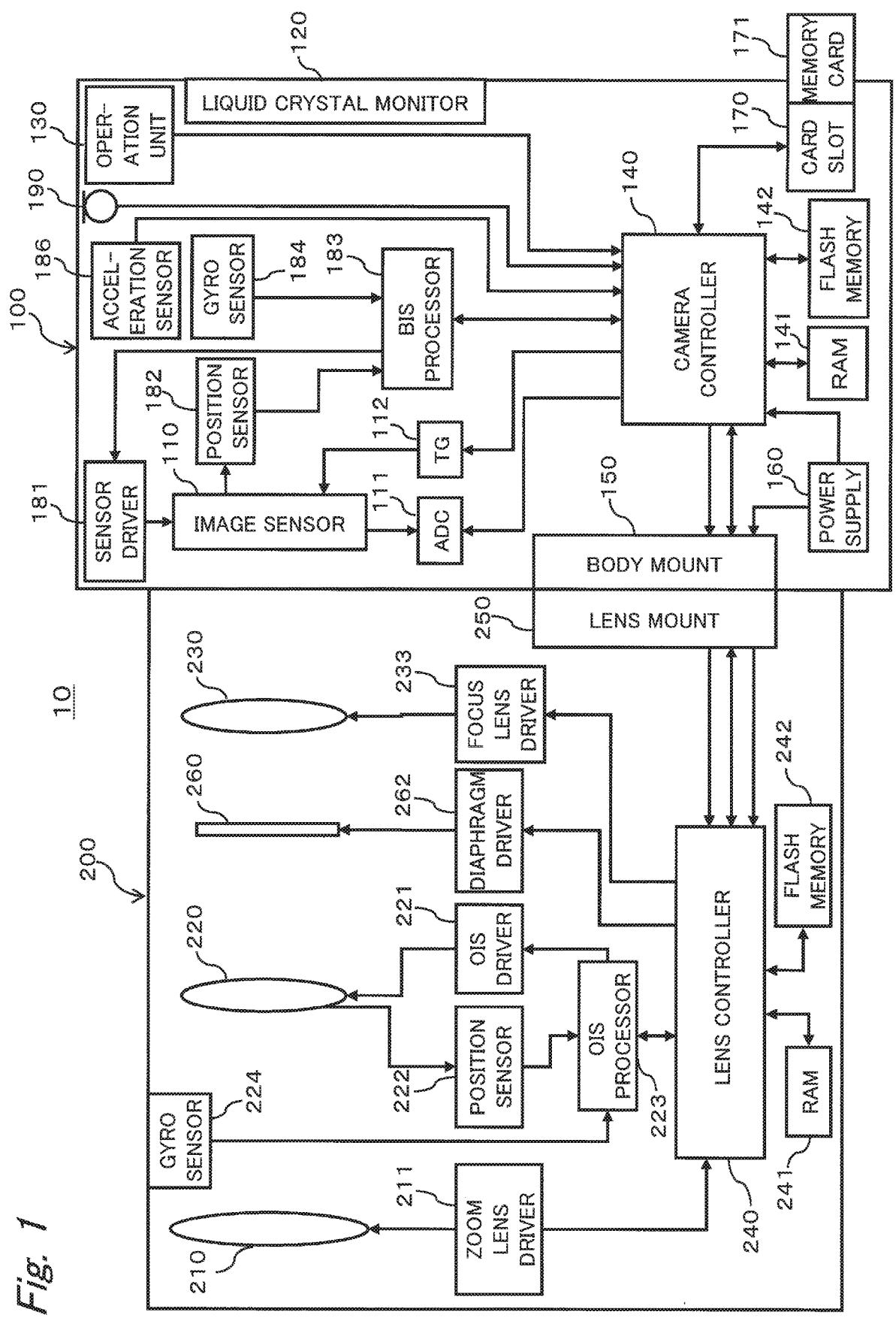
FIG. 1 is a block diagram illustrating a configuration of a digital camera according to a first embodiment of the present disclosure.

Hereinafter, embodiments of the present disclosure will be described with reference to the drawings as appropriate. However, in the detailed description, unnecessary portions of the description related to the prior art and substantially the same configuration may be omitted. This is to simplify the description. In addition, the following description and the accompanying drawings are disclosed to enable those skilled in the art to fully understand the present disclosure, and are not intended to limit the subject matter of the claims. In the following, a digital camera will be described as an example of an imaging device.

Problems of the Present Disclosure

In a digital camera having a shake correction function of moving an image sensor in a plane orthogonal to an optical axis to correct a shake, the image sensor is not fixed and is held movably so as to be movable according to the detected shake. That is, when the shake correction function is effective, the image sensor is held in a floating state so as to be held at a central position as a reference position by a magnetic force of magnets facing each other. When large force is applied to the image sensor held in this floating state from the outside, the image sensor moves. In this case, when the force applied from the outside is large, the image sensor may be greatly displaced beyond the correctable range.

For example, when large acceleration is applied to the digital camera, a large external force is applied to the image sensor, and the image sensor deviates greatly from the center position beyond the correctable range. In such a state, the shake correction function does not work well, and on the contrary, a large image blurring may occur. This problem may occur also when the digital camera is in an environment of high volume (in particular, bass (low tone)). That is, also when the image sensor is largely displaced by an external force caused by air vibration due to a high volume, the image sensor deviates greatly from the center position beyond the correctable range, resulting in a problem that the shake correction function does not work well.

A similar problem may occur also in a digital camera having a function of moving a correction lens in a plane orthogonal to the optical axis to correct the shake. That is, the correction lens is not fixed either, and is held in a floating state so as to be movable according to the detected shake. Also when large force is applied to the correction lens held in a floating state from the outside, the correction lens may be greatly displaced beyond the correctable range, resulting in a problem that the shake correction function does not work well.

In the following embodiments, the configuration of a digital camera for solving the problems will be described.

First Embodiment

The digital camera according to the present embodiment has a shake correction function for reducing an influence of a shake of the camera to a captured image in each of an interchangeable lens and a camera body. Specifically, in the interchangeable lens, a shake correction lens is moved in a plane perpendicular (orthogonal) to an optical axis of an optical system according to the shake detected by the shake sensor such as a gyro sensor, to reduce the influence of the shake. In the camera body, an image sensor such as a CCD is moved in a plane perpendicular to the optical axis of the optical system according to the shake detected by the shake sensor, to reduce the influence of the shake. In the description hereinafter, the function of shifting the correction lens in the interchangeable lens to correct the shake is referred to as "OIS (Optical Image Stabilizer) function". In addition, the function of shifting the image pickup element in the camera body to correct the shake is referred to as "BIS (Body Image Stabilizer) function".

1. Configuration

FIG. 1 is a block diagram illustrating a configuration of a digital camera according to a first embodiment of the present disclosure. The digital camera 10 includes a camera body 100 and an interchangeable lens 200 attachable thereto and detachable therefrom. Respective components of the camera body 100 and the interchangeable lens 200 will be specifically described below.

1-1. Camera Body

The camera body 100 (an example of an imaging device) includes an image sensor 110, a liquid crystal monitor 120, an operation unit 130, a camera controller 140, a body mount 150, a power supply 160, and a card slot 170.

The camera controller 140 controls the overall operation of the digital camera 10 by controlling components such as the image sensor 110 according to instructions from the release button. The camera controller 140 transmits the vertical synchronization signal to the timing generator 112. In parallel with this, the camera controller 140 generates an exposure synchronization signal. The camera controller 140 periodically transmits the generated exposure synchronization signal to the lens controller 240 via the body mount 150 and the lens mount 250. The camera controller 140 uses the DRAM 141 as a work memory during control operations and image processing operations.

The image sensor 110 is an element that captures an object image incident through the interchangeable lens 200 to generate image data. The image sensor 110 is, for example, a CCD, a CMOS image sensor, and an NMOS image sensor. The generated image data is digitized by the AD converter 111. The digitized image data is subjected to predetermined image processing by the camera controller 140. The predetermined image processing includes, for example, gamma correction processing, white balance correction processing, flaw correction processing, YC conversion processing, electronic zoom processing, and JPEG compression processing.

The image sensor 110 operates at the timing controlled by the timing generator 112. The image sensor generates a still image, a moving image, or a through image for recording. The through image is mainly a moving image and displayed on the liquid crystal monitor 120 so that the user can determine composition for capturing a still image.

The liquid crystal monitor 120 displays an image such as a through image and various information such as a menu screen. Instead of the liquid crystal monitor, another type of display device, for example, an organic EL display device may be used.

The operation unit 130 includes various operation members such as a release button for instructing start of capturing, a mode dial for setting a capturing mode, and a power switch. The operation unit 30 also includes a touch panel overlaid on the liquid crystal monitor 120.

The card slot 170 can mount the memory card 171, and controls the memory card 171 based on control from the camera controller 140. The digital camera 10 can store image data into the memory card 171 and can read image data from the memory card 171.

The power supply 160 is a circuit that supplies power to each element in the digital camera 10.

The body mount 150 is mechanically and electrically connectable with the lens mount 250 of the interchangeable lens 200. The body mount 150 can transmit and receive data to and from the interchangeable lens 200 via the lens mount 250. The body mount 150 transmits the exposure synchronization signal received from the camera controller 140 to the lens controller 240 via the lens mount 250. In addition, the other control signals received from the camera controller 140 are transmitted to the lens controller 240 via the lens mount 250. In addition, the body mount 150 transmits the signal received from the lens controller 240 to the camera controller 140 via the lens mount 250. In addition, the body mount 150 supplies the power from the power supply 160 to the entire interchangeable lens 200 via the lens mount 250.

In addition, as a configuration to achieve the BIS function (function to correct a shake by shifting the image sensor 110), the camera body 100 further includes a gyro sensor 184 (shake sensor) that detects the shake of the camera body 100, and a BIS processor 183 that controls the shake correction processing based on the detection result of the gyro sensor 184. Furthermore, the camera body 100 includes a sensor driver 181 that moves the image sensor 110, and a position sensor 182 that detects the position of the image sensor 110.

The sensor driver 181 drives the image sensor 110 in a plane perpendicular (orthogonal) to the optical axis of the optical system. The sensor driver 181 includes, for example, a magnet and a flat coil, and supports the image sensor 110 in a floating state.

The position sensor 182 is a sensor that detects the position of the image sensor 110 in a plane perpendicular to the optical axis of the optical system. The position sensor 182 can be implemented, for example, by a magnet and a Hall element.

Based on the signal from the gyro sensor 184 and the signal from the position sensor 182, the BIS processor 183 controls the sensor driver 181 to shift the image sensor 110 in a plane perpendicular to the optical axis so as to cancel the shake of the camera body 100.

Furthermore, the camera body 100 includes a microphone 190 that inputs sound to generate a sound signal. In addition, the camera body 100 further includes an acceleration sensor 186 that detects the acceleration of the digital camera 10.

1-2. Interchangeable Lens

The interchangeable lens 200 includes an optical system, a lens controller 240, and a lens mount 250. The optical system includes a zoom lens 210, an OIS (Optical Image Stabilizer) lens 220, a focus lens 230, and a diaphragm 260.

The zoom lens 210 is a lens for changing the magnification of the object image formed by the optical system. The zoom lens 210 is driven by the zoom lens driver 211. The zoom lens driver 211 includes a zoom ring that can be operated by the user. The zoom lens driver 211 moves the zoom lens 210 along the optical axis direction of the optical system according to the user's operation of the zoom ring.

The focus lens 230 is a lens for changing the focus state of the object image formed on the image sensor 110 in the optical system. The focus lens 230 is driven by the focus lens driver 233. The focus lens driver 233 includes an actuator or a motor, and moves the focus lens 230 along the optical axis of the optical system based on the control of the lens controller 240.

The OIS lens 220 is a lens for correcting blurring of an object image formed by the optical system of the interchangeable lens 200, in the OIS function. The OIS lens 220 moves in a direction in which the shake of the digital camera 10 is canceled, to reduce blurring of the object image on the image sensor 110. The OIS lens 220 includes at least one lens. The OIS lens 220 is driven by the OIS driver 221.

The OIS driver 221 shifts the OIS lens 220 in a plane perpendicular to the optical axis of the optical system under the control of the OIS processor 223. The OIS driver 221 includes, for example, a magnet and a flat coil, and supports the OIS lens 220 in a floating state.

The position sensor 222 is a sensor that detects the position of the OIS lens 220 in a plane perpendicular to the optical axis of the optical system. The position sensor 222 can be implemented, for example, by a magnet and a Hall element. The OIS processor 223 controls the OIS driver 221 based on the output of the position sensor 222 and the output of the gyro sensor 224

The diaphragm 260 adjusts the amount of light incident on the image sensor 110. The diaphragm 260 is driven by the diaphragm driver 262, and a size of an aperture of the diaphragm 260 is controlled.

The gyro sensor 184 or 224 detects a shake (vibration) in the yawing direction and the pitching direction based on an angular change per unit time, that is, an angular velocity, of the digital camera 10. The gyro sensor 184 or 224 outputs an angular velocity signal indicating the amount of the detected shake (angular velocity) to the OIS processor 223 or the BIS processor 183. Instead of the gyro sensor, another sensor capable of detecting the shake of the digital camera 10 can be used.

The camera controller 140 and the lens controller 240 may be configured by hard-wired electronic circuits, or may be configured by a microcomputer using a program or the like. For example, the camera controller 140 and the lens controller 240 can be implemented by a processor such as a CPU, an MPU, a GPU, a DSU, an FPGA, or an ASIC.

1-3. Sensor Driver

Figure 2:
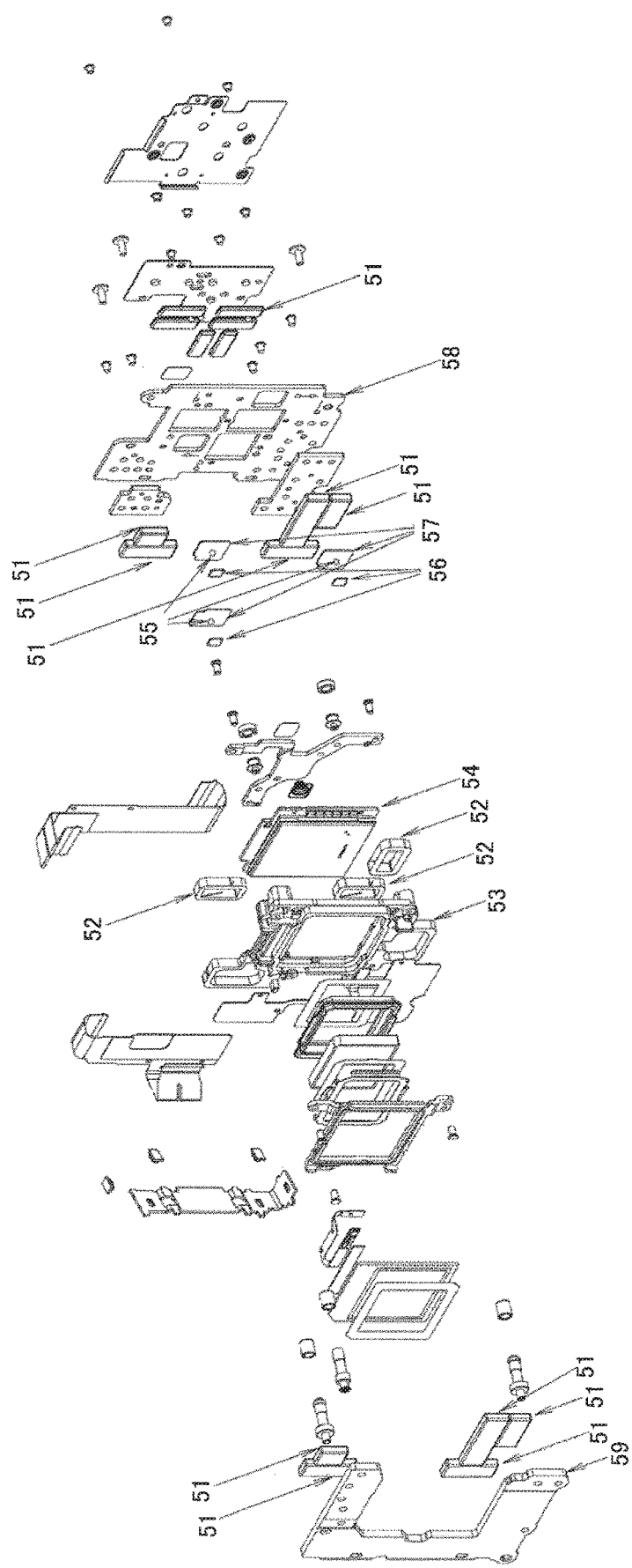
FIG. 2 is a diagram illustrating a schematic configuration of a mechanism for driving an image sensor related to the BIS function.

FIG. 2 is a diagram schematically illustrating the mechanical configuration of the sensor driver 181 that drives the image sensor 110 in the BIS function. In the sensor driver 181, the image sensor 110 is disposed on the sensor substrate 54. The sensor substrate 54 is held by the sensor holder 53.

The sensor holder 53 further holds some electromagnets 51. Each of the main plate 58 and the counter yoke 59 also holds the magnet 51. The main plate 58 and the counter yoke 59 are mechanically fixed to each other.

However, the main plate 58 and the counter yoke 59 are not mechanically fixed to the sensor holder 53. That is, the sensor holder 53 is configured to be able to move in a plane, with the ball 55 sandwiched between the ball plate 56 and the ball plate 57. When current flows through an electromagnet 52, repulsive force and attractive force due to the magnetic force are generated between the electromagnet 52 and the magnet 51. By controlling these forces, the relative position of the sensor holder 53 with respect to the main plate 58 is controlled. That is, the image sensor 110 can be driven.

1-3-1. Fixing Mechanism of Image Sensor

Figure 3:
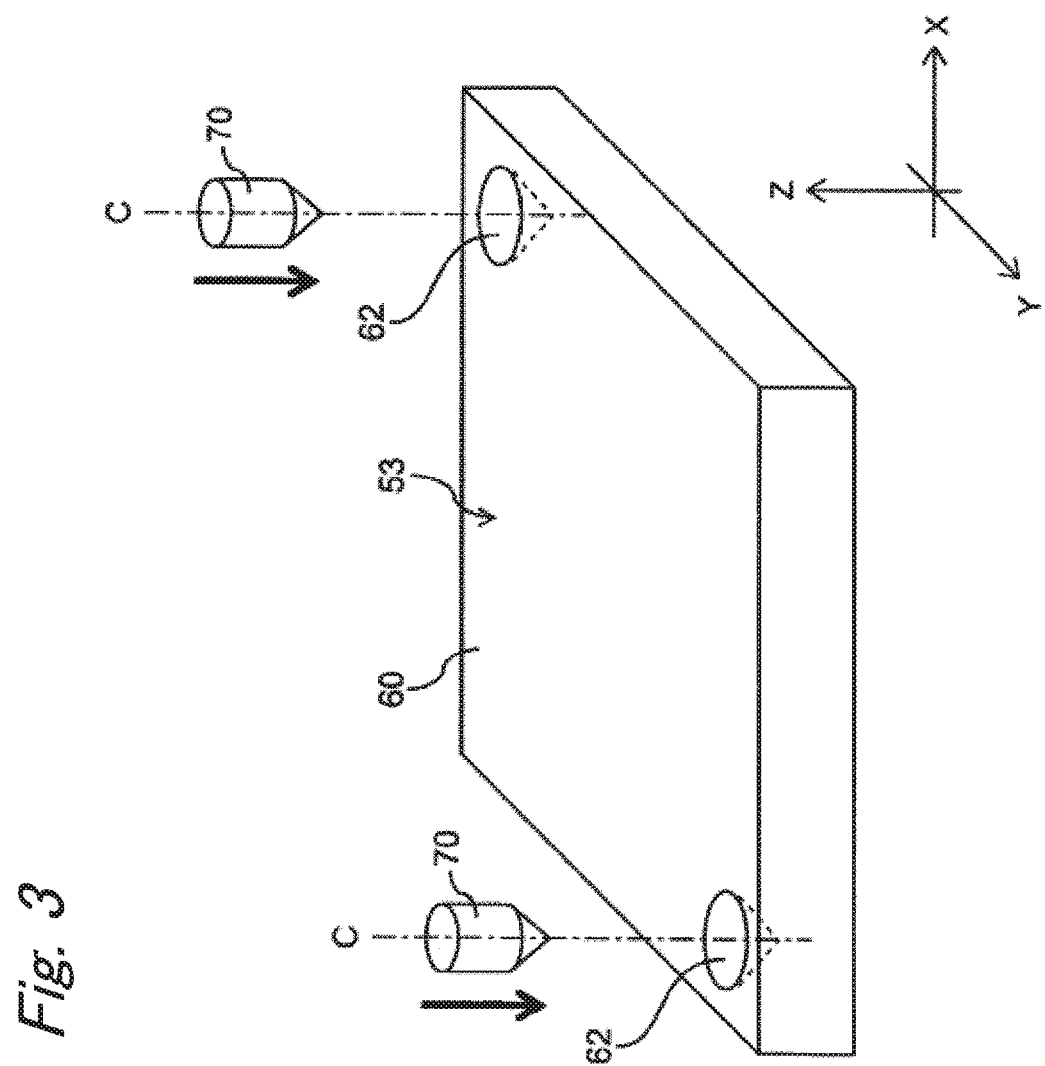
FIG. 3 is a diagram illustrating a first configuration example of a mechanism for fixing the image sensor.

The sensor driver 181 includes a fixing mechanism that mechanically fixes the image sensor 110 so that the image sensor 110 does not move, in addition to a mechanism that moves the image sensor 110 in a plane orthogonal to the optical axis. FIG. 3 is a diagram illustrating an example of the configuration of the fixing mechanism.

As illustrated in FIG. 3, the fixing mechanism includes a fixing pin 70 and a sensor holder 53. A tip portion of the fixing pin 70 has a conical shape. The fixing mechanism further includes a pin drive mechanism (described in detail later) that moves the fixing pin 70 in the direction along the axis C.

A flat portion on which recessed portions 62 can be disposed in the outer peripheral portion of the sensor holder 53 configures a substrate 60. The substrate 60 of the sensor holder 53 is provided with two recessed portions 62 having a conical shape corresponding to the shape of the tip portion of the fixing pin 70. The image sensor 110 is disposed on the main surface side opposite to the main surface of the substrate 60 provided with the recessed portions 62. A relative position between the recessed portion 62 and the sensor holder 53 will be described. The recessed portion 62 is a portion that fits the fixing pin 70 to fix the sensor holder 53. The sensor holder 53 can move in the plane orthogonal to the optical axis as described above. That is, the range in which the sensor holder 53 can move is the vertical and horizontal directions of the camera body 100 (corresponding to X and Y directions when the optical axis direction L is the Z direction). Therefore, the recessed portions 62 are arranged at two places positioned at diagonal corners of the sensor holder 53, to fix the sensor holder 53 at a predetermined position. However, the recessed portions 62 do not have to be arranged in two places, and may be arranged in one place or in three or more places if possible. In addition, although the recessed portions 62 are desirably positioned at diagonal corners of the sensor holder 53, the recessed portions 62 may be arranged at places other than the places positioned at the diagonal corners. In addition, the recessed portion 62 may be disposed on any surface of the sensor holder 53. That is, the recessed portion 62 may be disposed on the front surface of the sensor holder 53 (object direction), or the recessed portion 62 may be disposed on the back surface of the sensor holder 53 (direction opposite to the object). In addition, the position of the fixing pin 70 is disposed at a position facing the recessed portion 62.

Normally, the fixing pin 70 is controlled to be positioned at a first position that is away from the sensor holder 53. Thus, the sensor holder 53, that is, the image sensor 110 can freely move in the plane orthogonal to the optical axis. When fixing the sensor holder 53, that is, the image sensor 110, the fixing pin 70 is moved to a second position, and the fixing pin 70 is completely fitted into the recessed portion 62 of the sensor holder 53. Thus, the sensor holder 53 is mechanically fixed, and the movement of the sensor holder 53 is regulated.

Figure 4A:
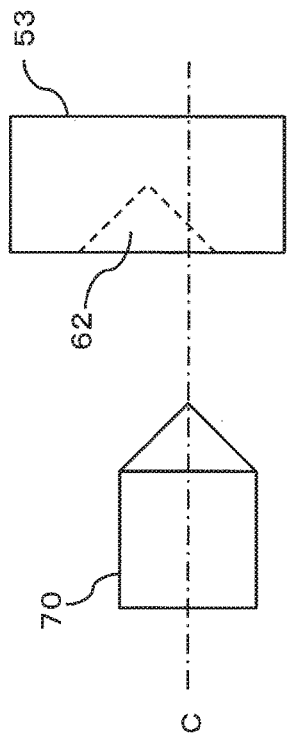
FIGS. 4A to 4D are diagrams illustrating a fixing operation of a sensor holder with a fixing pin in the first configuration example.
Figure 4B:
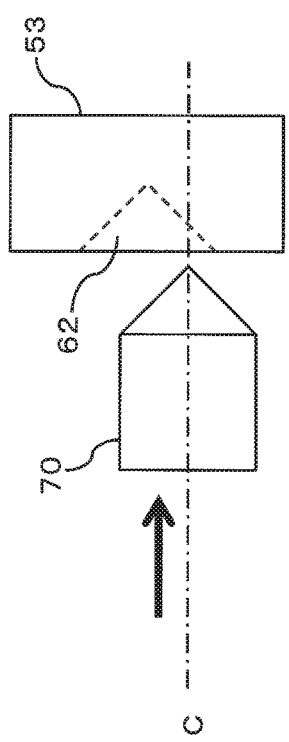
Figure 4C:
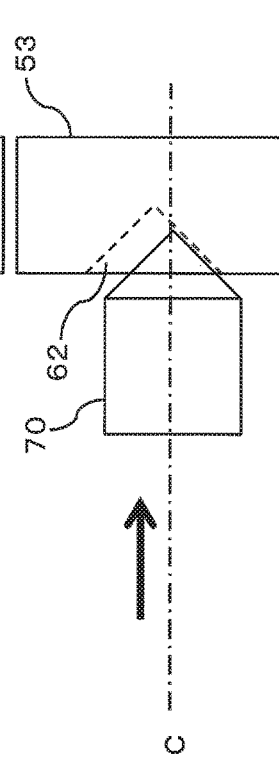
Figure 4D:
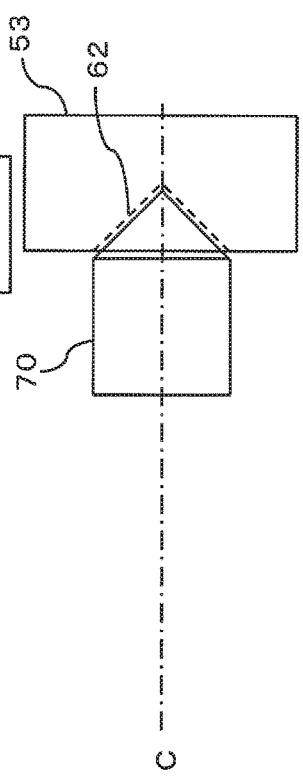

FIGS. 4A to 4D are diagrams illustrating the fixing operation of the sensor holder 53 (that is, the image sensor 110) with the fixing pin 70. FIG. 4A illustrates a state in which the fixing pin 70 is at the first position and is away from the sensor holder 53. In this state, in order to fix the sensor holder 53, that is, the image sensor 110, the fixing pin 70 is moved to approach the sensor holder 53 as illustrated in FIG. 4B. In a case where the fixing pin 70 abuts on a part of the recessed portion 62 of the sensor holder 53, when the center of the fixing pin 70 and the center of the recessed portion 62 are deviated (see FIG. 4C), the sensor holder 53 moves. As illustrated in FIG. 4D, when the fixing pin 70 reaches the second position, the fixing pin 70 is fitted into the recessed portion 62 of the sensor holder 53 so that the centers of the fixing pin 70 and the recessed portion 62 coincide with each other. Thus, the sensor holder 53 is fixed at a predetermined position (for example, the center position at the time of shake correction), and the movement of the image sensor 110 is regulated.

FIG. 5 is a diagram illustrating another configuration example of the fixing mechanism. In the fixing mechanism in FIG. 5, rectangular parallelepiped projection portions 64 are provided at two opposing corners of the substrate 60 of the sensor holder 53. The fixing pin 70b has an L-shape and is fitted with the projection portion 64.

When the sensor holder 53 is not fixed, the fixing pin 70b is controlled to a first position in which the fixing pin 70b does not abutting on and is away from the projection portion 64 of the sensor holder 53. On the other hand, when the sensor holder 53 is fixed, the fixing pin 70b is moved to the second position in which an inner L-shaped region of the fixing pin 70b completely abuts on the projection portion 64 of the sensor holder 53.

Figure 6C:
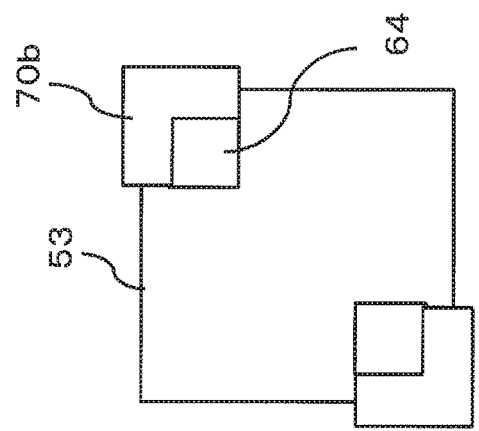
FIGS. 6A to 6C are diagrams illustrating a fixing operation of a sensor holder with a fixing pin in the second configuration example.
Figure 6B:
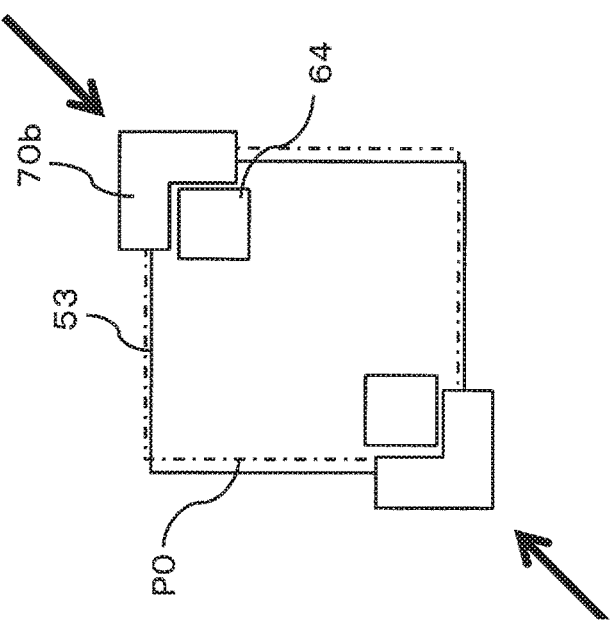
Figure 6A:
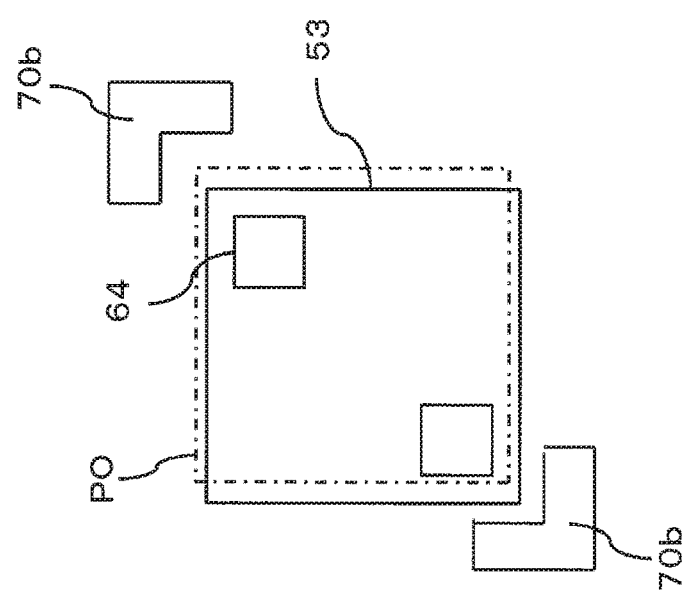

FIGS. 6A to 6C are diagrams illustrating the fixing operation with the fixing mechanism illustrated in FIG. 5. FIG. 6A is a diagram illustrating a state in which the fixing pin 70b is at the first position and is away from the sensor holder 53. In the drawing, "PO" indicates the sensor holder 53 being at the center position. As illustrated in FIG. 6B, in order to fit the sensor holder 53, that is, the image sensor 110, the fixing pin 70b is moved to approach the sensor holder 53. As illustrated in FIG. 6C, the fixing pin 70b is moved to the second position and completely abuts on the projection portion 64 of the sensor holder 53, whereby the sensor holder 53 (that is, the image sensor 110) is fixed at the center position.

Figure 7B:
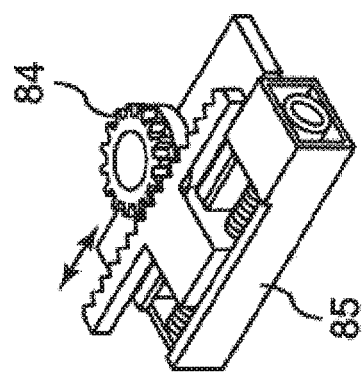
FIGS. 7A to 7C are diagrams illustrating a configuration example of a pin drive mechanism for moving the fixing pin in a straight line.
Figure 7A:
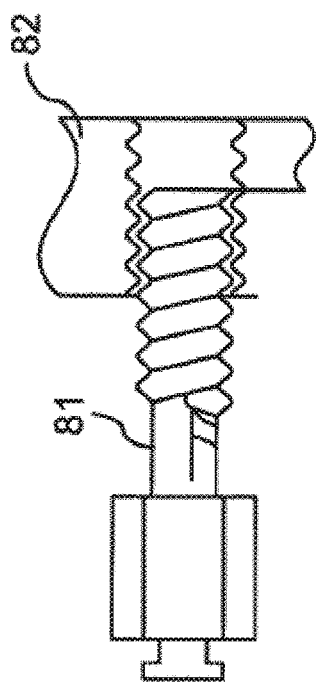
Figure 7C:
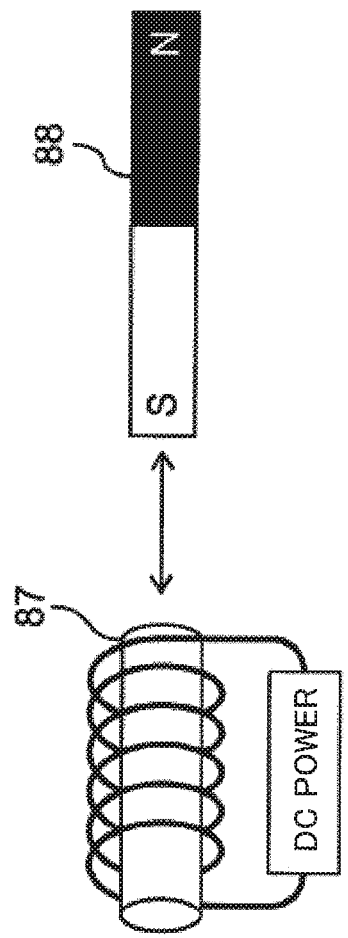

FIGS. 7A to 7C are diagrams illustrating a configuration example of a pin drive mechanism for moving the fixing pin 70 or 70b in the fixing mechanism. The pin drive mechanism illustrated in FIG. 7A includes a feed screw 81. Rotating the feed screw 81 with a motor, an actuator, or the like, a moving portion 82 slides. Connecting the fixing pin 70 or 70b to the moving portion 82, the fixing pin 70 or 70b can be moved straight. In the pin drive mechanism illustrated in FIG. 7B, rotating the gear 84 with a motor, an actuator, or the like, the moving portion 85 moves therewith to slide. Connecting the fixing pin 70 or 70b to the moving portion 85, the fixing pin 70 or 70b can be moved straight. The pin drive mechanism illustrated in FIG. 7C includes an electromagnet 87 and a magnet 88. The fixing pin 70 or 70b is connected to the magnet 88. Applying a DC voltage to the electromagnet 87, a magnetic field is generated and the fixing pin 70 or 70b is moved using a repulsive force generated between the magnetic field and the magnet 88.

The digital camera 10 and the camera body 100 are examples of an imaging device. The sensor holder 53 is an example of a sensor holder. The sensor driver 181 is an example of a sensor driver. The camera controller 140 and the lens controller 240 are examples of a controller. The OIS lens 220 is an example of a correction lens. The microphone 190 is an example of a sound pickup device. The OIS driver 221 is an example of a lens driver. The OIS processor 223 is an example of a correction processor. The acceleration signal and the sound signal are examples of a predetermined signal.

2. Operation

The operation at the time of shake correction of the digital camera 10 configured as described above will be described.

FIG. 8 is a flowchart illustrating fixing process of the image sensor 110. The camera controller 140 inputs a detection signal (acceleration signal) indicating the acceleration of the digital camera 10 from the acceleration sensor 186 (S11). Furthermore, the camera controller 140 inputs a sound signal from the microphone 190 (S12). The camera controller 140 compares a value of the acceleration indicated by the detection signal with a first threshold value, and compares an input sound level with a second threshold value (S12).

Here, the first threshold value is set, for example, to a value or less of the acceleration at which the image sensor 110 is displaced to an extent exceeding a control range of the BIS function. The second threshold value is set, for example, to a value or less of a sound level at which the image sensor 110 largely vibrates due to air vibration caused by sound and is displaced to an extent exceeding the control range of the BIS function. The first threshold value is, for example, 3 G (gravity), and the second threshold value is, for example, 120 dB. However, these threshold values are appropriately increased or decreased according to the following conditions (the following conditions are an example).

Weight of sensor holder
Shape of sensor holder
Weight of image sensor
Shape of image sensor
Magnetic force generated by magnet
Shape of magnet
Magnetic force generated by electromagnet
Shape of electromagnet
Positional relationship between magnet and electromagnet
Frequency distribution of sound and acceleration When the detected acceleration is larger than the first threshold value, and/or when the sound level is larger than the second threshold value (YES in S13), the camera controller 140 controls the sensor driver 181 to mechanically fix the sensor holder 53 (that is, the image sensor 110) (S14). The sensor driver 181 moves the fixing pin 70 to fit into the recessed portion 62. Alternatively, the sensor driver 181 moves the fixing pin 70b to abut on the projection portion 64. Thus, the sensor holder 53 (that is, the image sensor 110) is mechanically fixed.

On the other hand, when the acceleration is the first threshold value or less and the sound level is the second threshold value or less (NO in S13), the camera controller 140 determines whether or not the sensor holder 53 (that is, the image sensor 110) is in a fixed state continuously for a predetermined time or more (S15). When the sensor holder 53 is in the fixed state continuously for the predetermined time or more (YES in S15), the camera controller 140 controls the sensor driver 181 to release the fixing of the sensor holder 53 (S16). That is, the camera controller 140 releases the fixing of the sensor holder 53 (that is, the image sensor 110) by moving the fixing pin 70 or 70b away from the recessed portion 62 or the projection portion 64.

When the sensor holder 53 is not in the fixed state continuously for the predetermined time or more (NO in S15), the camera controller 140 does nothing.

As described above, when at least one of the acceleration and the sound level is larger than the respective threshold values, the sensor holder 53, that is, the image sensor 110 is fixed. Thus, in a state where the acceleration or sound level is high, the shake of the digital camera 10 is detected, and even if a control signal for moving the image sensor 110 to cancel the shake is transmitted from the BIS processor 183 to the sensor driver 181, the image sensor 110 is not driven.

It should be noted that while the image sensor 110 is mechanically fixed, the BIS function may be set valid or invalid. However, immediately before fixing the image sensor 110, it is necessary to set the BIS function valid. This is because if the BIS function is turned off immediately before fixing, the holding force with respect to the image sensor 110 to the center position is lost, the image sensor 110 is largely deviated from the center position, and the fixing pin 70 or 70b is largely deviated with respect to the recessed portion 62 or the projection portion 64, so that the fixing cannot be achieved. In addition, it is necessary to set the BIS function valid immediately before releasing the fixing of the image sensor 110. This is because the BIS function is made to work immediately after the fixing is released.

3. Effect and the Like

As described above, the digital camera 10 or the camera body 100 of the present embodiment includes the image sensor 110 that captures an object image to generate image data, the sensor holder 53 that holds the image sensor 110, the sensor driver 181 that moves the sensor holder 53 in a plane orthogonal to an optical axis, the fixing mechanism (62, 70, or 70b) that mechanically fixes the sensor holder 53 at a predetermined position, and the camera controller 140 that controls the fixing mechanism based on a signal indicating the degree of displacement of the image sensor 110 due to an external force (for example, an acceleration signal, or a sound signal).

With the above configuration, when the displacement (vibration) of the image sensor 110 due to an external force is large, the image sensor 110 can be mechanically fixed automatically. Therefore, the BIS function can be invalidated under conditions where a large force is applied to the image sensor 110. That is, the BIS function is automatically invalidated under conditions of large acceleration and/or high volume sound. Therefore, under such conditions (that is, under conditions where the image sensor 110 is driven beyond a correctable range), image blurring that may occur when the BIS function is performed can be reduced and image quality deviation can be reduced.

Second Embodiment

In the first embodiment, the configuration of fixing the image sensor 110 inside the camera body 100 to substantially invalidate the BIS function when the acceleration or the input sound level is at a certain level or more is described. On the other hand, in the present embodiment, a configuration of fixing the OIS lens 220 to substantially invalidate the OIS function when the acceleration or the input sound level is at a certain level or more will be described. It should be noted that the digital camera of the present embodiment also has the configuration illustrated in FIG. 1 and has the OIS function.

Figure 9:
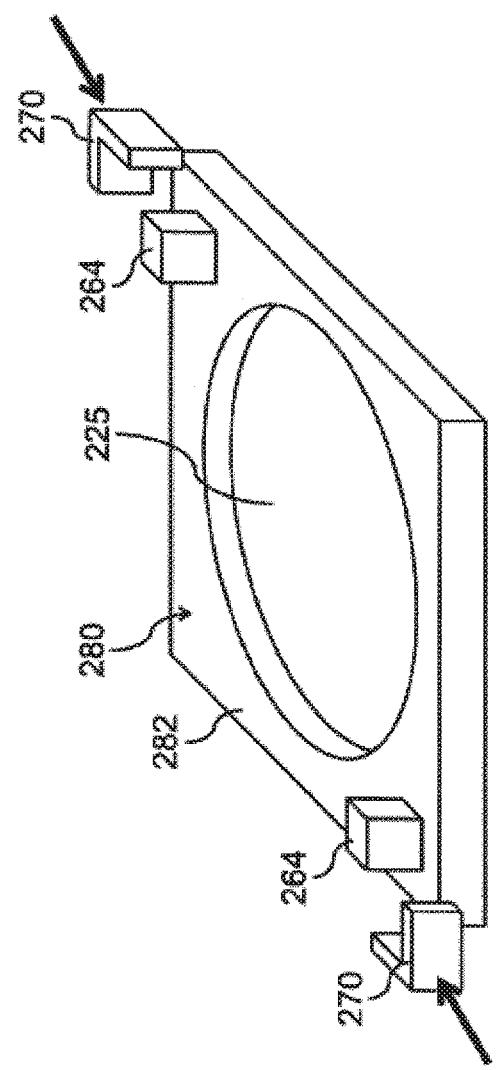
FIG. 9 is a diagram illustrating a configuration example of a mechanism for fixing an OIS lens in a second embodiment of the present disclosure.

The digital camera 10 according to the present embodiment has a function for mechanically fixing the OIS lens 220 based on the acceleration or the input sound level. FIG. 9 is a diagram illustrating an example of the configuration of a fixing mechanism that fixes the OIS lens 220 in the digital camera 10. In FIG. 9, an opening 225 is provided at the center of the substrate 282 of the lens holder 280 that holds the OIS lens 220. The OIS lens 220 is attached to the opening 225. The lens holder 280 is an example of a lens holder.

The substrate 282 of the lens holder 280 is provided with projection portions 264 at two opposing corners. L-shaped fixing pins 270 are disposed to opposite to the projection portions 264. The function of the fixing pin 270 and the configuration that drives the fixing pin 270 are the same as those of the fixing pin 70b illustrated in FIGS. 5 and 6A to 6C in the first embodiment.

The lens holder 280 and the fixing pin 270 are included in the OIS driver 221. The lens holder 280 is supported in a normal floating state so as to be movable in a plane orthogonal to the optical axis. When a shake is detected based on the detection signal from the gyro sensor 224, the lens holder 280 (that is, OIS lens 220) is moved in a plane orthogonal to the optical axis so as to cancel the shake.

For this reason, the fixing pin 270 is normally controlled at a position that is away from the projection portion 264. Thus, the lens holder 280, that is, the OIS lens 220 comes into a state of being movable in a plane orthogonal to the optical axis.

When it is desired to fix the OIS lens 220, that is, the lens holder 280, in order to invalidate the OIS function, the fixing pin 270 is caused to move to abut on the corresponding projection portion 264. Thus, since the lens holder 280 is mechanically fixed, even when a control signal for driving the OIS lens 220 is transmitted from the OIS processor 223 to the OIS driver 221, the OIS lens 220 cannot move.

Figure 10:
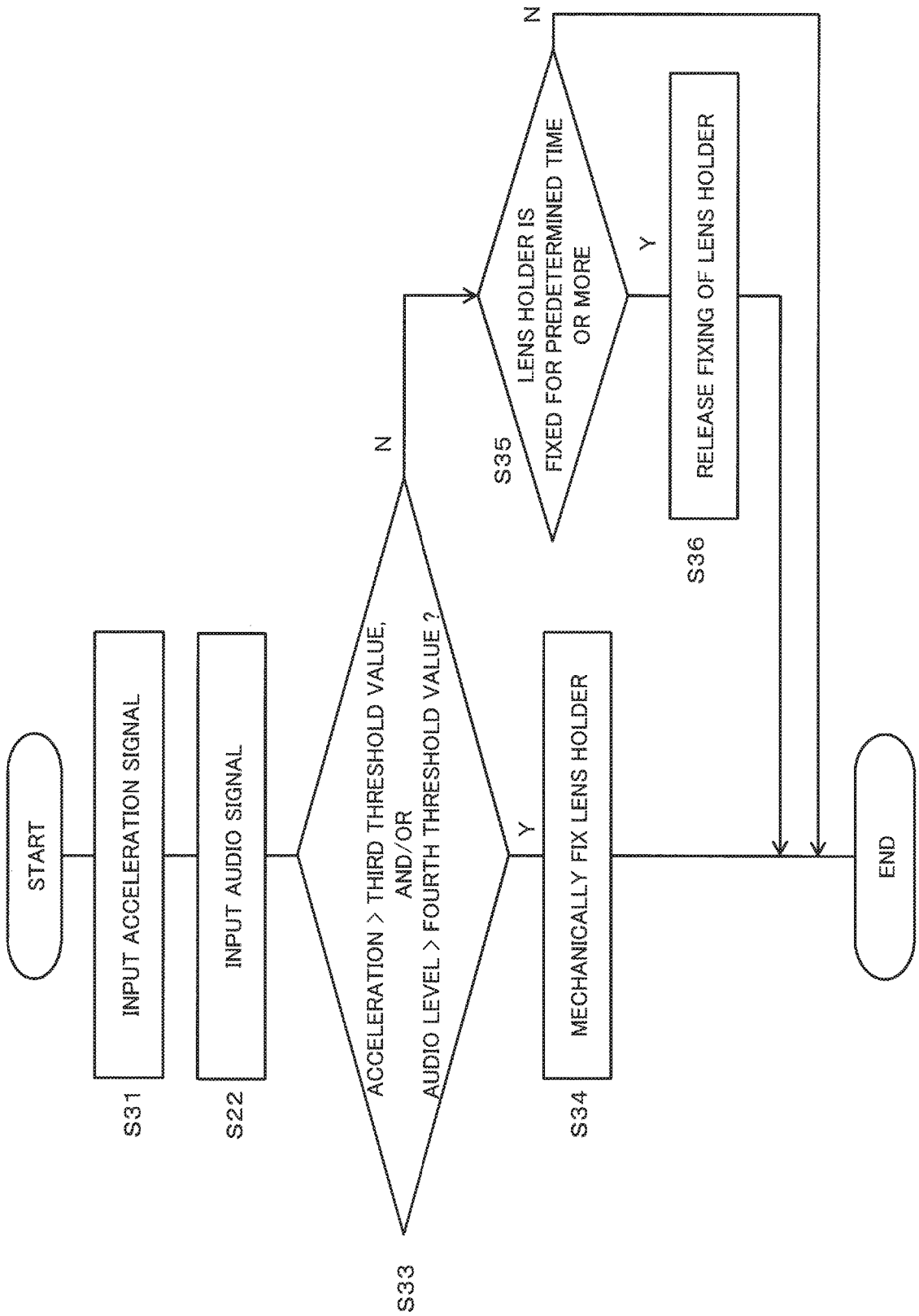
FIG. 10 is a flowchart illustrating fixing processing of the OIS lens based on acceleration and sound level in the second embodiment of the present disclosure.

FIG. 10 is a flowchart illustrating fixing processing of the OIS lens 220, performed by the lens controller 240 of the interchangeable lens 200. The lens controller 240 inputs a detection signal indicating the acceleration of the digital camera 10 from the acceleration sensor 186 of the camera body 100 via the lens mount 250 (S31). Furthermore, the lens controller 240 inputs a sound signal from the microphone 190 via the lens mount 250 (S32). The lens controller 240 compares a value of the acceleration indicated by the detection signal with a third threshold value, and compares an input sound level with a fourth threshold value (S32).

Here, the third threshold value is set, for example, to a value or less of an acceleration at which the OIS lens 220 is displaced to an extent of exceeding the control range of the OIS function. The fourth threshold value is set, for example, to a value or less of a sound level at which the OIS lens 220 is displaced to an extent of exceeding the control range of the OIS function by air vibration due to sound. The third threshold value is, for example, 3 G (gravity), and the fourth threshold value is, for example, 120 dB. However, these threshold values are appropriately increased or decreased according to the following conditions (the following conditions are an example).

Weight of lens holder
Shape of lens holder
Weight of lens
Shape of lens
Magnetic force generated by magnet
Shape of magnet
Magnetic force generated by electromagnet
Shape of electromagnet
Positional relationship between magnet and electromagnet
Frequency distribution of sound and acceleration When the detected acceleration is larger than the third threshold value, and/or when the sound level is larger than the fourth threshold value (YES in S33), the lens controller 240 controls the OIS driver 221 to mechanically fix the lens holder 280 (that is, the OIS lens 220) (S34). Thus, the fixing pin 270 moves so as to abut on the projection portion 264, and the lens holder 280 (that is, the OIS lens 220) is mechanically fixed.

On the other hand, when the acceleration is the third threshold value or less and the sound level is the fourth threshold value or less (NO in S33), the lens controller 240 determines whether or not the lens holder 280 (that is, the OIS lens 220) is in a fixed state continuously for a predetermined time or more (S35). When the lens holder 280 is in the fixed state continuously for the predetermined time or more (YES in S35), the lens controller 240 releases the fixing of the lens holder 280 (S36). That is, the lens controller 240 controls the fixing pin 270 so that the fixing pin 270 is separated from the projection portion 264 to release the fixing of the lens holder 280 (that is, the OIS lens 220).

When the lens holder 280 is not in the fixed state continuously for the predetermined time or more (NO in S35), the lens controller 240 does nothing.

As described above, the interchangeable lens 200 of the present embodiment is a lens that has a shake correction function and can be mounted on the camera body 100. The interchangeable lens 200 includes the optical system 220 including the OIS lens 220, the lens holder 280 that holds the OIS lens 220, the OIS driver 221 that moves the lens holder 280 in a plane orthogonal to the optical axis to perform shake correction, the fixing mechanism (264 and 270) that mechanically fixes the lens holder 280 in a predetermined position, and the lens controller 240 that controls the fixing mechanism. The lens controller 240 controls the fixing mechanism (264 and 270) to mechanically fix the lens holder 280 at a predetermined position based on a signal (for example, an acceleration signal or a sound signal) indicating the degree of displacement of the lens holder 280 due to an external force.

In addition, the digital camera 10 of the present embodiment includes the interchangeable lens 200 and the camera body 100 on which the interchangeable lens 200 is mounted. The digital camera 10 includes the optical system including the OIS lens 220, the image sensor 110 that captures an object image obtained via the optical system to generate image data, the lens holder 280 that holds the OIS lens 220, the OIS driver 221 that moves the lens holder 280 in a plane orthogonal to the optical axis to perform shake correction, the fixing mechanism (264 and 270) that mechanically fixes the lens holder 280 at a predetermined position, and the lens controller 240 that controls the fixing mechanism based on a signal (for example, an acceleration signal or a sound signal) indicating the degree of displacement of the lens holder 280 due to an external force.

According to the above configuration, the lens holder 280, that is, the OIS lens 220 is mechanically fixed automatically, based on the magnitude of displacement of the lens holder 280 due to external force (specifically, magnitude of acceleration, sound level, or the like). Thus, the OIS function is invalidated under conditions in which the displacement of the lens holder 280 due to external force is large. Therefore, under such conditions (that is, under conditions in which the OIS lens 220 is driven beyond the correctable range), it is possible to reduce image blurring that may occur when the OIS function is performed, and to reduce image quality deterioration.

Other Embodiments

The concept of the above embodiments is not limited to the embodiments described above. Various embodiments may be considered. In the following, other embodiments to which the concept of the above embodiments can be applied will be described.

In the above embodiments, in the processing of determining whether or not to fix the image sensor 110 or the OIS lens 220, an acceleration signal or an input sound signal is used as a signal indicating the degree of displacement of the image sensor 110 or the lens holder 280. Instead of these signals, a detection signal from the gyro sensor 184 or 224 may be used. That is, other signal may be used as long as the other signal indicates the amount of movement (displacement) of the image sensor 110 or the OIS lens 220. For example, whether or not to fix the image sensor 110 may be determined based on the control signal output from the BIS processor 183 to the sensor driver 181. Similarly, whether or not to fix the OIS lens 220 may be determined based on the control signal output from the OIS processor 223 to the OIS driver 221. Alternatively, the angular acceleration of the digital camera 10 (that is, the image sensor 110 or the OIS lens 220) may be detected and the detection signal may be used.

In the above embodiments, whether or not to perform the processing of fixing the image sensor 110 or the OIS lens 220 may be set by the user, which is described by using the flowcharts in FIGS. 8 and 10. For example, validation or invalidation of the function of performing the processing illustrated in the flowcharts in FIGS. 8 and 10 may be set on the menu screen or with a predetermined button operation.

The fixing mechanism of the image sensor 110 or the OIS lens 220 illustrated in the above embodiments is an example, and is not limited to the above. That is, a fixing mechanism having arbitrary configuration may be used as long as the fixing mechanism can mechanically fix the image sensor 110 or the OIS lens 220.

Although the lens interchangeable type camera is described as an example of the imaging device, the imaging device may be a lens integrated type camera.

In the above, the embodiments are described as the exemplification of the technique in the present disclosure. To that end, a detailed description and accompanying drawings are disclosed. Thus, among the components described in the detailed description and the accompanying drawings, components not essential for solving the problem may be included. Therefore, those non-essential components should not be immediately recognized as essential only because those non-essential components are described in the detailed description and the accompanying drawings.

The above embodiments are for illustrating the technique in the present disclosure. Therefore, various changes, substitutions, additions, and/or omissions may be made in the above embodiments within the scope of the claims or the equivalents thereof.

INDUSTRIAL APPLICABILITY

The concept of the present disclosure can be applied to an electronic device having an imaging function provided with a shake correction function (imaging device such as a digital camera or a camcorder, a mobile phone, a smartphone, and the like).

What is claimed is:

1. An imaging device comprising:
   an image pickup element that captures an object image to generate image data;
   a sensor holder that holds the image pickup element;
   a sensor driver that moves the sensor holder in a plane orthogonal to an optical axis;
   a fixing mechanism that mechanically fixes the sensor holder at a predetermined position; and
   a controller that controls the fixing mechanism to invalidate a function of the sensor driver, when a signal indicating a degree of displacement of the image pickup element due to an external force is larger than a predetermined value.

2. The imaging device according to claim 1, further comprising a sensor that detects any one of acceleration, angular velocity and angular acceleration of the imaging device, and wherein the signal indicating a degree of displacement of the image pickup element due to external force is based on an output of the sensor.

3. The imaging device according to claim 1, further comprising a sound pickup device that outputs a sound signal generated based on an input sound, and wherein the signal indicating a degree of displacement of the image pickup element due to external force is based on the sound signal output by the sound pickup device.

4. The imaging device according to claim 1, further comprising a correction processor that controls the sensor driver based on a shake of the imaging device,
   wherein the controller controls the fixing mechanism based on a control signal output from the correction processor to the sensor driver.

5. An imaging device including an interchangeable lens, and a camera body on which the interchangeable lens is mounted, the imaging device comprising:
   an optical system including a correction lens;
   an image pickup element that captures an object image obtained through the optical system, to generate image data;
   a lens holder that holds the correction lens;
   a lens driver that moves the lens holder in a plane orthogonal to an optical axis to perform shake correction;
   a fixing mechanism that mechanically fixes the lens holder at a predetermined position; and
   a controller that controls the fixing mechanism to invalidate a function of the lens driver, when a signal indicating a degree of displacement of the image pickup element due to an external force is larger than a predetermined value.

6. The imaging device according to claim 5, further comprising a sensor that detects any one of acceleration, angular velocity and angular acceleration of the interchangeable lens or the camera body, to output a detection signal indicating a detection result, and wherein the signal indicating a degree of displacement of the image pickup element due to external force is based on an output of the sensor.

7. The imaging device according to claim 5, further comprising a sound pickup device that outputs a sound signal generated based on an input sound, and wherein the signal indicating a degree of displacement of the image pickup element due to external force is based on the sound signal output by the sound pickup device.

8. The imaging device according to claim 5, further comprising a correction processor that controls the lens driver based on a shake of the imaging device,
   wherein the controller controls the fixing mechanism based on a control signal output from the correction processor to the lens driver.

9. An interchangeable lens having a shake correction function, the interchangeable lens that can be mounted on a camera body, the interchangeable lens comprising:
   an optical system including a shake correction lens;
   a lens holder that holds the shake correction lens;
   a lens driver that moves the lens holder in a plane orthogonal to an optical axis to perform shake correction;
   a fixing mechanism that mechanically fixes the lens holder at a predetermined position; and
   a controller that controls the fixing mechanism,
   wherein the controller controls the fixing mechanism to mechanically fix the lens holder at a predetermined position to invalidate a function of the lens driver, when a signal indicating a degree of displacement of the lens holder due to an external force is larger than a predetermined value.

\* \* \* \* \*